Patented Aug. 15, 1944

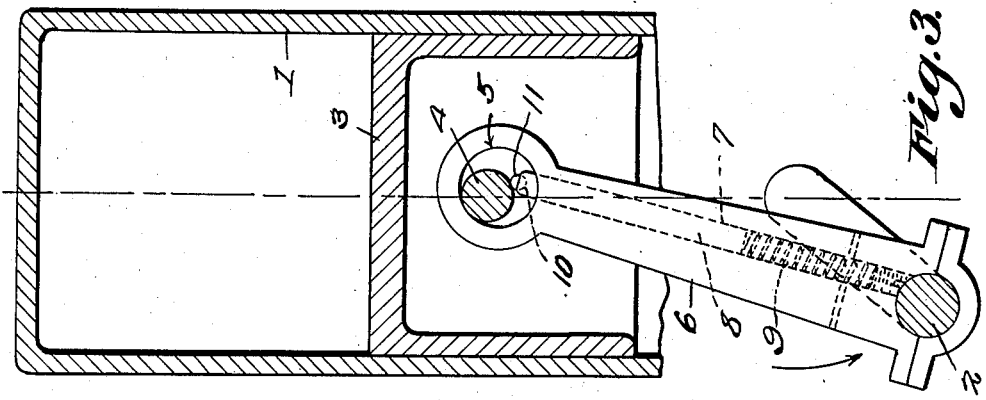
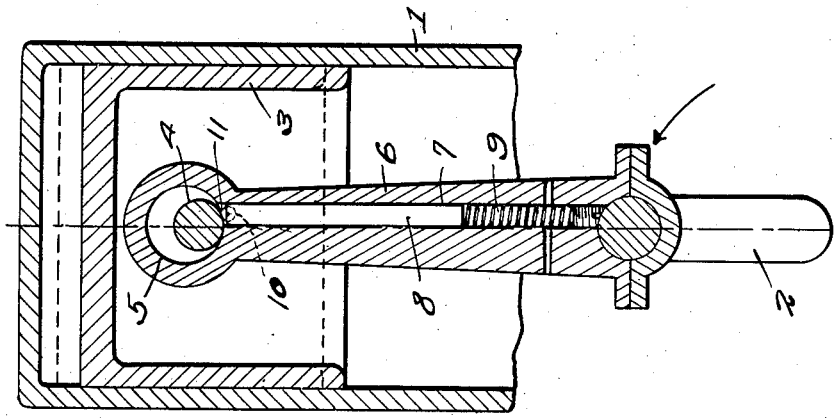
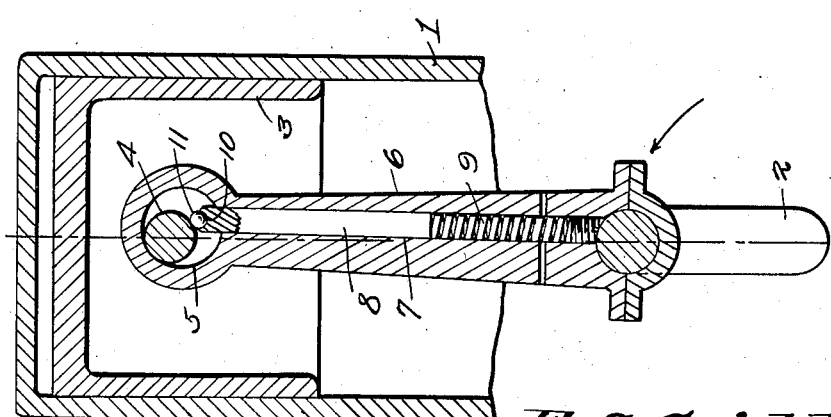

2,356,033

UNITED STATES PATENT OFFICE 2,356,033

INTERNAL-COMBUSTION ENGINE

Edward S. Criddle, Franklin, Tenn.

Application December 2, 1942, Serial No. 467,637

7 Claims. (Cl. 123—78)

This invention relates to internal combustion engines of the type utilizing reciprocating pistons, crank shafts and connecting rods.

It is a well recognized fact among those skilled in the art that considerable power is lost during the operation of an internal combustion of this type due to the inertia of the working parts when the piston reaches each limit of its stroke. Furthermore, at the time of the explosion of the charge, if under maximum compression, the crank shaft is not in its most favorable position to receive the full force of the explosion. Various attempts have been made to overcome these objectionable features but, as far as I am aware, all of these attempts have necessitated the use of a connection between the piston and the crank shaft which has held the piston constantly under restraint during working conditions. Consequently the most effective results have not been attainable.

A further object is to utilize the force of the explosion of a charge to create a combustion chamber of such size as to provide complete combustion of the fuel without regard to R. P. M., and at the same time store energy in a spring so that when the piston has proceeded on its power stroke to a position where the pressures exerted by the exploded charge and by the spring are equal, the spring will assume the load by maintaining a compression in the combustion chamber equal to the force exerted by the spring and until the energy of the spring has been expended.

A still further object is to provide a piston capable of sliding movement independently of its connecting rod as a result of which the piston, when subjected to the force of the exploded charge, will move bodily relative to the rod and transmit power with a driving effect to said rod and to the crank, thereby increasing the power of the engine as compared with one in which the piston and rod have a relative pivotal movement only and the piston, as a result, exerts a pressing action instead of a driving action.

It is a well known fact that any predetermined volume of fuel requires a chamber of a predetermined size in order to insure complete combustion in a confined area.

In an engine of usual construction the charge is exploded at a time when the size of the combustion chamber is only a fraction of that required for complete combustion. At this point, if the load exceeds the force of the explosion in this fractional chamber, only a small part of the rated horsepower is released from the explosion because the piston does not move away from the cylinder head with sufficient rapidity to create a chamber large enough to effect complete combustion at the instant of explosion.

The present invention overcomes this weakness of the conventional engine by using a piston capable of free motion during the period required to increase the size of the chamber to that necessary for complete combustion, following which the load is engaged abruptly, thereby obtaining advantage of the high velocity of the piston at the instant of complete combustion, whereby the complete rated horsepower is exerted by the engine without regard to the load or R. P. M.

A still further object is to provide a piston the return driving stroke of which starts independently of the movement of the driven crank, the construction being such, however, that the load is thereafter picked up gradually without causing pounding.

Another object is to create an explosion chamber without regard to load or R. P. M. which is large enough to permit the explosion to complete itself in said chamber whether the fuel be of a quick flash, low octane quality or a slow burning high octane quality.

With the foregoing and other objects in view which will appear as the description proceeds, the invention consists of certain details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a central vertical section through a portion of an engine embodying the present improvements, the piston being shown at its point of maximum compression or exhaust.

Figure 2 is a similar view showing the position of the parts immediately following the explosion and at the instant the connecting rod assumes the piston load.

Figure 3 is another view similar to Figs. 1 and 2, showing the positions of the parts during the completion of the power stroke and immediately prior to the return of the piston on the exhaust or compression stroke.

Referring to the figures by characters of reference, 1 designates an engine cylinder, and the crank shaft has been indicated at 2. The usual piston 3 is provided with a pin 4 of the ordinary construction which, in the present instance, is extended through a circular opening 5 in one end of a connecting rod 6. The diameter of the opening is somewhat greater than that of the pin so that the connecting rod thus can have a limited lateral movement relative to the pin and piston.

Formed within the connecting rod is a longitudinal bore 7 located a short distance to one side of the longitudinal center of the connecting rod, this bore opening into the aperture 5 and being provided with a plunger 8, one end of which bears against a coiled spring 9 seated in the bore. The other end of the plunger has a socket 10 in which a ball 11 is held and this ball is positioned where it will contact constantly with the bottom portion of the pin 4 but at one side of the lowermost point on said pin. The spring 9 is of such strength as to substantially balance the maximum compression of the charge used in the cylinder so that, during the compression stroke, the spring will press against the plunger 8 with sufficient force to cause the ball 11 to hold the upper portion of the wall of opening 5 pressed downwardly against the top portion of the pin 4. Consequently, and as shown in Fig. 1, a charge admitted to the combustion chamber, will be fully compressed when the piston is thrust toward the head by the connecting rod acting through spring 9, plunger 8 and ball 11. When the maximum compression occurs, the crank 2 is in a dead center position and at this instant of maximum compression the explosion of the charge can be effected if desired. This will result in the piston being thrust downwardly against the action of ball 11, plunger 8 and spring 9, these parts being forced downwardly relative to the connecting rod by the thrust transmitted thereto by the descending pin 4. Thus the size of the combustion chamber will be increased as the piston moves from its initial or maximum position to the position at the end of the movement just described and as illustrated in Fig. 2. During this independent movement of the piston relative to the connecting rod, the pin 4 will not exert a direct downward blow upon the bottom portion of the wall of opening 5 but, instead, will exert in effect a wedging action between one side portion of the wall of opening 5 and the ball 11, the said ball and pin 4 thus cooperating to press the end of the connecting rod laterally with the result that a wiping contact is set up between pin 4 and the wall of opening 5 as the pin and connecting rod change their relative positions, and the pin ultimately assumes a position at the center of the bottom of opening 5. In Fig. 3 the connecting rod has been shown in its laterally shifted position.

The foregoing action, which occurs while the crank 2 is moving past its dead center position, results in the storage of energy in spring 9 and when the piston has proceeded on its power stroke to a position where the pressures exerted by the exploded charge and by the spring are equal, the spring will assume the load by maintaining a compression in the combustion chamber equal to the force exerted by the spring and until the energy of the spring has been expended.

In other words if the explosion of the charge produces a pressure of 200 lbs. and the spring is capable of exerting a pressure of 100 lbs., the force of the explosion will result both in an enlargement of the combustion chamber independently of the movement of the crank, and in the storage of 100 lbs. compression in the spring due to pressure of pin 4 on plunger 8 and spring 9. As the piston proceeds on its power stroke the pressure of the gas ultimately becomes reduced to 100 lbs. or equal to that stored in the spring. The spring then comes into action and increases the distance between the crank and the piston by pressing the piston toward the cylinder head so as thereby to supplement the force exerted by the burning gas by holding the gas under the pressure of the spring to insure the maintenance of a driving force during the period when displacement would ordinarily occur. During this actuation of the piston by the spring, the pin 4 is pushed upwardly with a wiping action along the wall of opening 5 until it is brought back to its initial position in the opening as shown in Fig. 3 and this relative position of the connecting rod and the piston pin is maintained throughout the compression and the exhaust stroke and until the piston is again subjected to the action of the exploded charge. It is desired to stress the fact that the pin 4 has a wiping action upon one-half of the circular wall of the opening 5. Because of the difference in diameters of the pin 4 and opening 5, there is permitted a pronounced lateral movement of the pin within the opening. The thrust device 8 is so located as to press laterally against pin 4 and thus maintain the connecting rod off center relative to pin 4 and this is true at all times during the operation of the engine. At the beginning of the power stroke the piston, because of the lost-motion connection between pin 4 and rod 6, will have a limited movement longitudinally independently of the connecting rod 6, this limited independent movement being substantially equal to the difference in diameters of the pin 4 and the opening 5. During this limited movement, however, one side of the wall of opening 5 is thrust laterally against pin 4 so that as the pin 4 descends, for example, from the position shown in Fig. 1, it will have a wiping action along the engaged side of the opening 5. As this side is curved gradually laterally toward the thrust element 8 at the bottom of the opening, it will be obvious that as the pin 4 approaches the lower limit of its independent movement within opening 5, it will wipe along that portion of the wall of the opening extending into the path of the pin, thus causing the independent movement of the pin to be brought to a stop gradually until such time as a direct thrust is exerted from pin 4 against the wall of opening 5. This wiping action of the pin 4 along the semicircular side of the opening 5 eliminates pounding. This device has a lost motion connection between the pin and the connecting rod but this lost motion is gradually absorbed during the last portion of each independent movement of the pin within the opening and until the pin is brought to a point where it exerts a positive thrust against the connecting rod in one direction or the other. The sole purpose of the thrust element 8 is to insure the positioning of the connecting rod off center relative to the pin 4 at all times during the stroke and as will be apparent by referring to the three positions shown in the drawing, and also for holding the piston normally thrust outwardly with its pin 4 adjacent to the outermost portion of the opening 5, with a pressure by spring 9 sufficient to effect maximum compression by the piston when the parts are located as in Fig. 1 but which spring will yield under the force exerted by an exploded charge.

It has been demonstrated in practice that the lost motion connection between the piston and the connecting rod herein described, operates effectively in engines of all speeds and insures greater power than has heretofore been possible and generally more efficient operation than where the usual connections are provided. Because of the instant increase in the size of the combustion chamber at the time of the explosion and without regard to the R. P. M., the driving force will be maintained under all variations in the load and without fuel knocking or mechanical pounding.

What is claimed is:

1. In an internal combustion engine a cylinder, a piston mounted for reciprocation therein, a shaft having a crank a connecting rod, a lost motion connecting between the rod and piston, and means cooperating with said connection for resisting lost motion during the compression of a charge and yielding under the force of an explosion of the charge, said lost motion connection constituting means for gradually transmitting the load from the rod to the piston.

2. In an internal combustion engine a cylinder, a piston, a piston pin movable with the piston, a crank shaft, a connecting rod carried by the shaft and having an opening through which the pin is extended, said opening being of a diameter greater than that of the pin to permit limited oscillation of the rod upon the pin, and yielding means for supporting the pin and piston relative to the connecting rod, said means being proportioned to overcome the resistance of a charge under maximum compression but to yield a predetermined distance under the force of the charge when exploded.

3. In an internal combustion engine a cylinder, a piston, a piston pin movable with the piston, a crank shaft, a connecting rod carried by the shaft and having an opening through which the pin is extended, said opening being of a diameter greater than that of the pin to permit limited oscillation of the rod upon the pin, and yielding means for supporting the pin and piston relative to the connecting rod, said means being proportioned to overcome the resistance of a charge under maximum compression but to yield under the force of the charge when exploded, said yielding means cooperating with the pin to maintain a wiping connection between the pin and the wall of the opening in the rod during the movement of the piston and pin in either direction within the cylinder and relative to the rod.

4. In an internal combustion engine a cylinder, a piston, a piston pin movable with the piston, a crank shaft, a connecting rod carried by the shaft and having an opening through which the pin is extended, said opening being of a diameter greater than that of the pin to permit limited oscillation of the rod upon the pin, and yieldingly supported antifriction means carried by the connecting rod for supporting the pin and piston relative to the connecting rod, said means being proportioned to overcome the resistance of a charge under maximum compression but to yield under the force of the charge when exploded.

5. In an internal combustion engine a cylinder, a piston, a piston pin movable with the piston, a crank shaft, a connecting rod carried by the shaft and having an opening through which the pin is extended, said opening being of a diameter greater than that of the pin to permit limited oscillation of the rod upon the pin, a member slidably mounted in and in the direction of the length of the connecting rod, a spring for exerting a thrust against the member and in the direction of the piston, and an antifriction device carried by the member for engaging the pin to support said pin and piston relative to the connecting rod, said spring being proportioned to overcome the resistance of a charge under maximum compression but to yield under the force of the charge when exploded.

6. In an internal combustion engine a cylinder, a piston, a piston pin movable with the piston, a crank shaft, a connecting rod carried by the shaft and having an opening through which the pin is extended, said opening being of a diameter greater than that of the pin to permit limited oscillation of the rod upon the pin, and yielding means for supporting the pin and piston relative to the connecting rod, said means including an antifriction device, a spring carried by the connecting rod, and a member for transmitting thrust from the spring to said antifriction device, said means being proportioned to overcome the resistance of a charge under maximum compression but to yield under the force of the charge when exploded, said yielding means cooperating with the pin to maintain a wiping connection between the pin and the wall of the opening in the rod during the movement of the piston and pin in either direction within the cylinder and relative to the rod.

7. In an internal combustion engine a cylinder, a piston, a piston pin movable with the piston, a crank shaft, a connecting rod carried by the shaft and having an opening through which the pin is extended, said opening being of a diameter greater than that of the pin to permit limited oscillation of the rod upon the pin, and yielding means for supporting the pin and piston relative to the connecting rod, said means being proportioned to overcome the resistance of a charge under maximum compression but to yield a predetermined distance under the force of the charge when exploded, said means being positioned to maintain one side portion only of the opening in wiping contact with the pin during relative movement of the pin and rod.

EDWARD S. CRIDDLE.